July 10, 1951 G. W. BORKLAND 2,559,705
APPARATUS FOR DRAWING THERMOPLASTIC SHEETS
Filed July 8, 1947 5 Sheets-Sheet 1

Inventor:
Gustave W. Borkland
By Thiess Olson + Mecklenburger
Attys

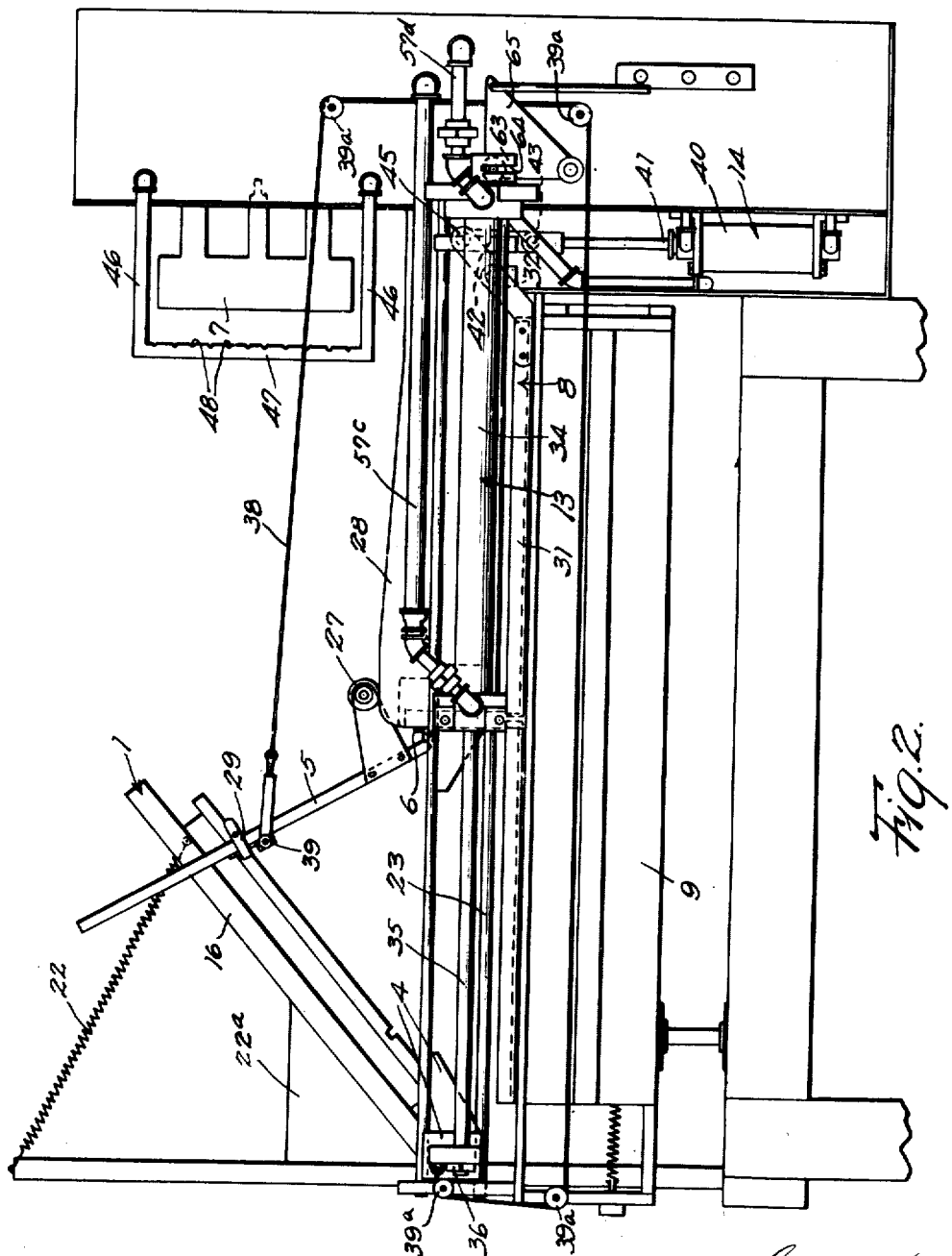

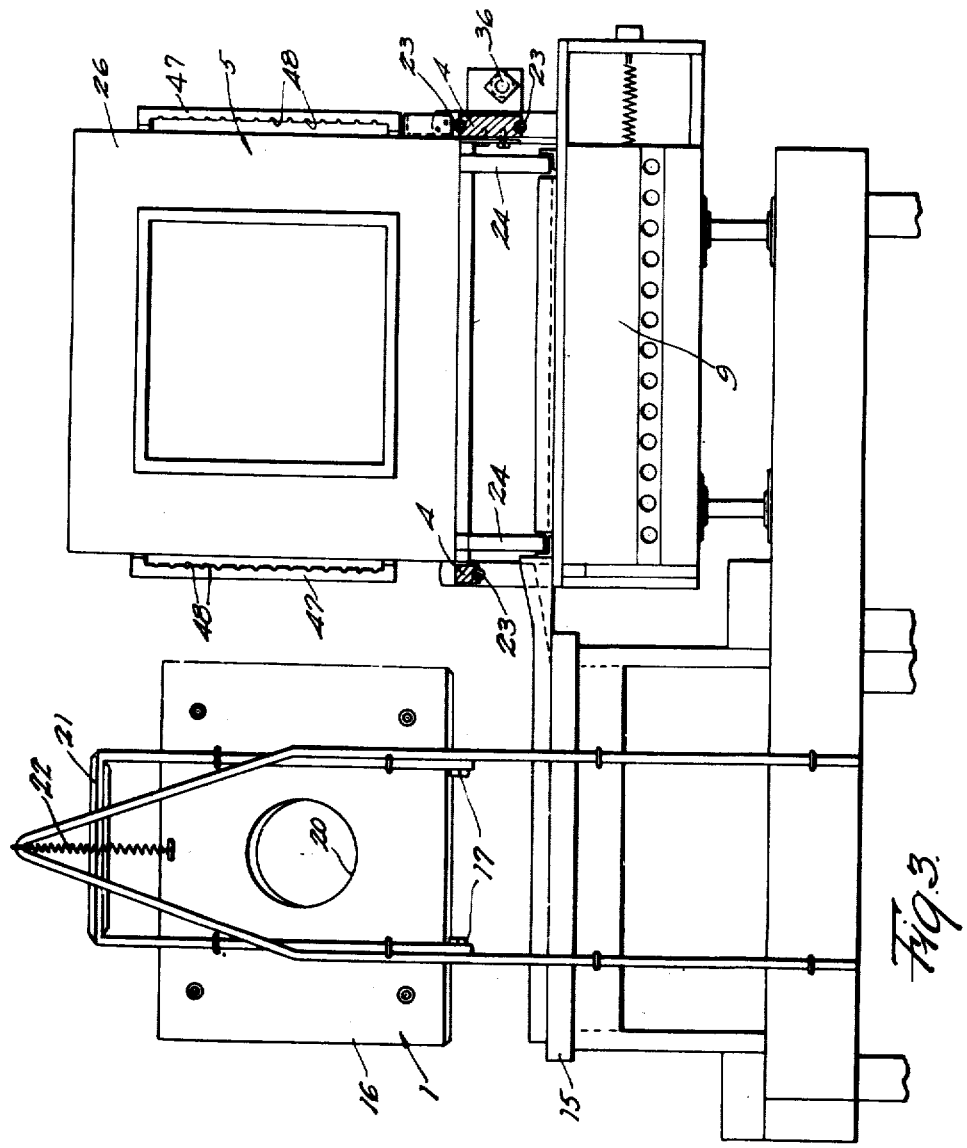

July 10, 1951 G. W. BORKLAND 2,559,705
APPARATUS FOR DRAWING THERMOPLASTIC SHEETS
Filed July 8, 1947 5 Sheets-Sheet 4
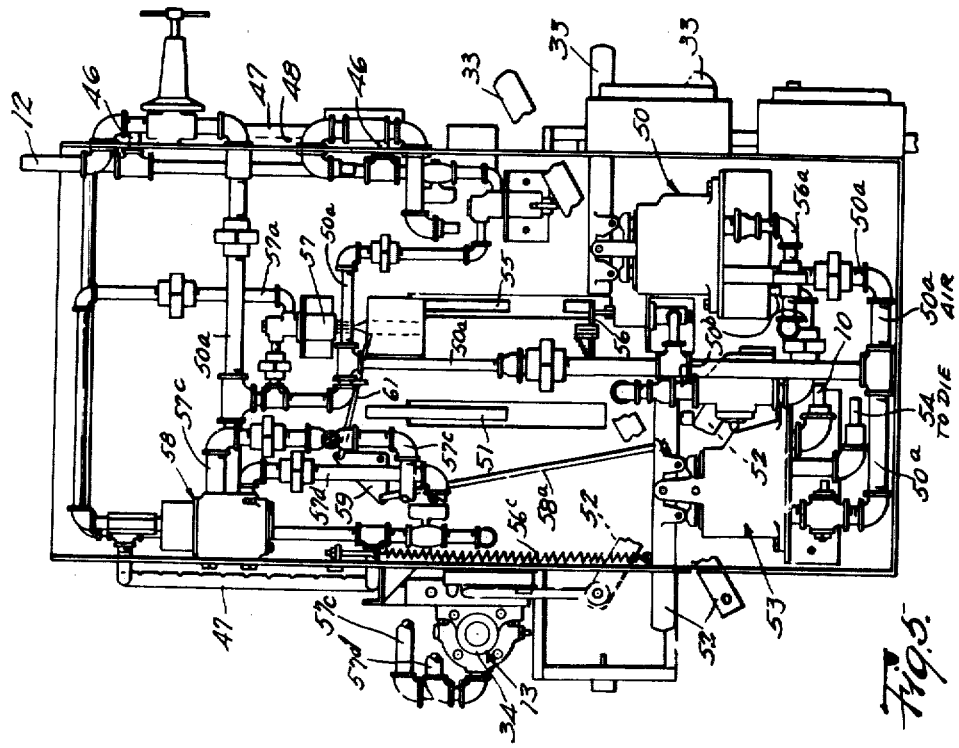
Inventor
Gustave W. Borkland.

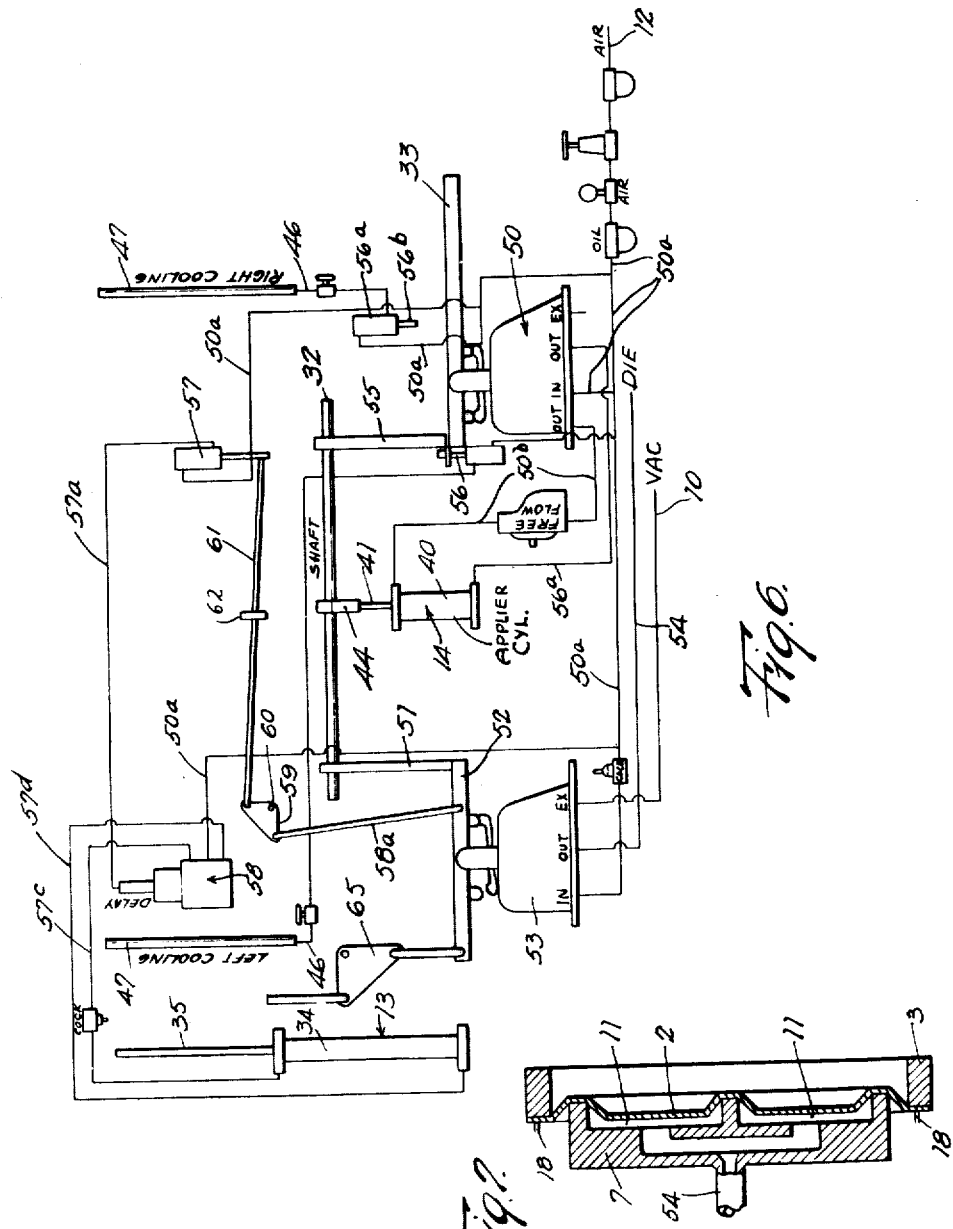

Patented July 10, 1951

2,559,705

UNITED STATES PATENT OFFICE 2,559,705

APPARATUS FOR DRAWING THERMO-
PLASTIC SHEETS

Gustave W. Borkland, Marion, Ind.

Application July 8, 1947, Serial No. 759,610

16 Claims. (Cl. 18—19)

My invention relates to an apparatus for drawing thermoplastic sheets.

One of the objects of my invention is to provide an improved apparatus for drawing thermoplastic sheet material which will enable the sheet material to be drawn into intimate contact with a forming mold or die by bringing the sheet into sealing engagement with respect to a die cavity and drawing or forcing the sheet into intimate engagement with the surface of the recess by differential air pressure.

Further objects and advantages of the invention will be apparent from the description and claims.

In the drawings in which my invention is illustrated,

Fig. 2 is a side elevation of the apparatus;

Fig. 3 is an end elevation of the apparatus;

Fig. 4 is a side elevation of one end of the apparatus;

Fig. 5 is an end view of the apparatus, showing the air pipes and controlling valves;

Fig. 6 is a schematic view showing the relation of parts; and

Fig. 7 is a vertical sectional view showing the die and the thermoplastic sheet applied thereto.

Figure 1:
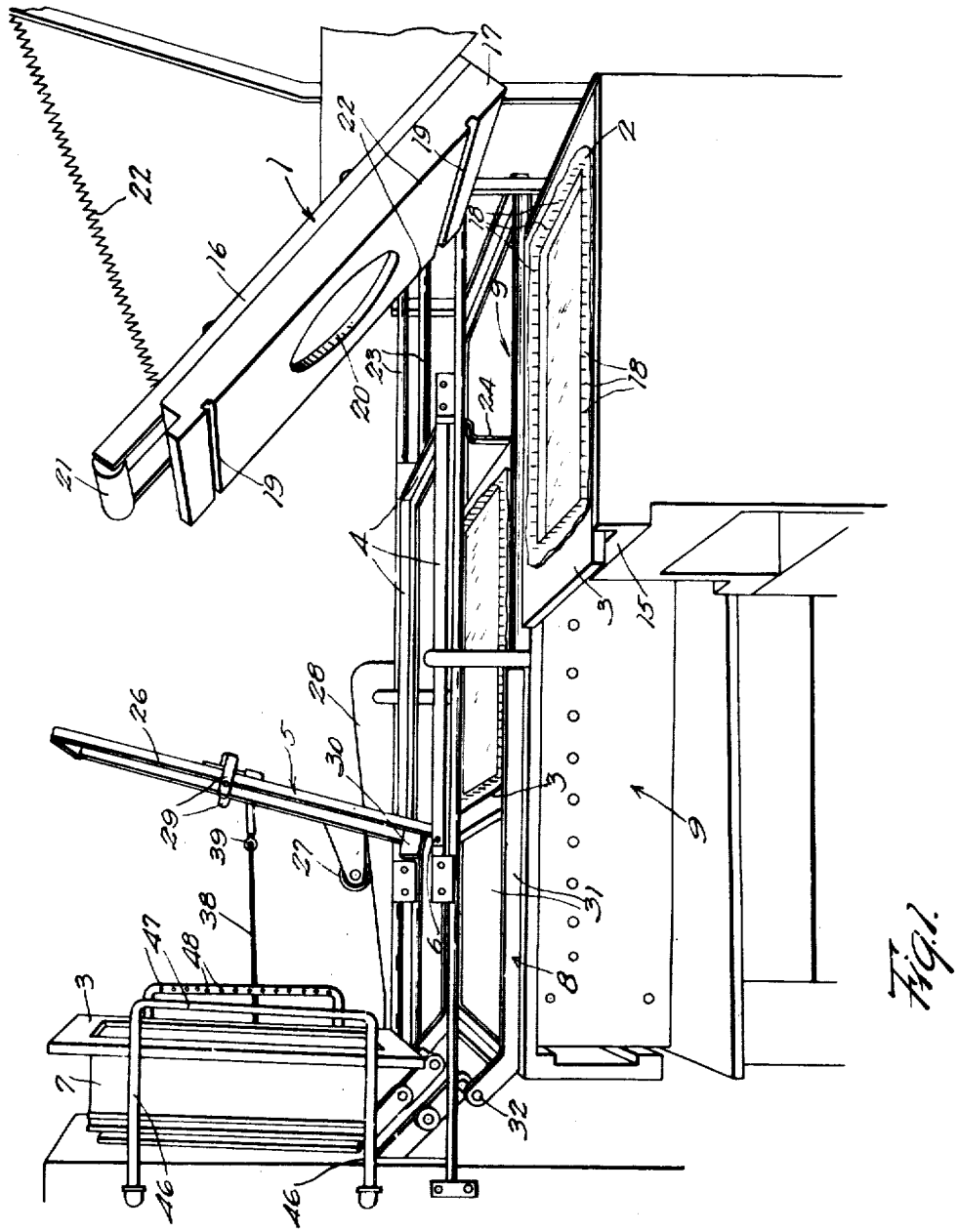
Figure 1 is a perspective view of a thermoplastic sheet drawing apparatus.

Referring to the drawings in detail, the construction shown comprises a framing press 1, by means of which the attendant can quickly apply a sheet 2 of thermoplastic material to a supporting and handling frame 3, a frame advancer and frame remover slide 4 in front of which the attendant places the frame-carrying sheet 3 in position to be advanced and which carries a frame remover 5 pivotally mounted thereon at 6 for engaging a frame carrying the formed sheet and removing it from the die 7, a swingable frame-applying carriage 8 which receives the frame 3 carrying the sheet from the frame advancer 4 and swings it up so that the sheet 2 effects an air-seal engagement with the recessed forming die to seal over the cavity or recesses in the forming die 7 (Fig. 7), heating means 9 for heating the frame-carried thermoplastic sheet both in the position in which it is initially placed and in the position to which it is moved after the frame advancer 4 has moved the frame and the sheet carried thereby into position above the frame-applying carriage 8, a source 10 (Figs. 5 and 6) of rarified air for application to the recesses 11 in the die 7 to draw the heated plastic sheet into intimate engagement with the surfaces of the recess, a source 12 of compressed air for application to the recesses in the die to assist in removing the formed sheet from the die, pneumatic power means 13 (Figs. 2 and 5) for effecting movement of the slide, transmission between the power means and slide 4, pneumatic power means 14 (Figs. 4 and 6) for effecting movement of the frame-applying carriage 8, and valve means for controlling movement of said power means for controlling the application of rarified and compressed air to the recessed die and for controlling the supply of cooling air.

The framing press 1 may be manually operated by the attendant. It comprises a table 15 (Figs. 1 and 3) of a convenient height on which the sheet-carrying frame 3 is placed, and a presser plate 16 pivotally mounted with respect to the table at 17 and movable from the raised position shown in Figs. 1 and 2 to a position in which it engages the plastic sheet 2 which is placed above the frame for pressing the sheet down on the frame and causing the sharp upwardly-projecting pins 18 on the frame to pierce the sheet and hold it securely to the frame. The presser plate 16 is provided with two transversely-extending recesses 19 into which the points of the holding pins may extend after they have completely pierced the sheet of plastic. The presser plate is provided with a central opening 20 to enable the ready escape of air. A suitable handle 21 is provided for effecting the pressing operation. The side edges 22 of the presser plate may be placed close enough together so as to lie inside the rows of pins. A suitable return spring 22 is provided for raising the presser plate after it has been lowered. Triangular stop plates 22a (Fig. 2) are provided for limiting the return movement.

The slide 4 comprises a rectangular frame mounted for sliding movement on three parallel bars 23 (Figs. 2 and 3) having a pair of downwardly-extending pusher fingers 24 for engaging the rearward edge of the sheet-carrying frame 3 when the attendant has placed the frame in position for feeding movement. The frame remover 5 comprises a rectangular frame 26 pivotally mounted at 6 on the frame advancer slide 4 and guided in its movement as the slide advances and recedes by means of a follower roller 27 engaging an inclined cam guide or track 28 by reason of which the frame 26 changes its position from the inclined withdrawn position shown in Fig. 2 to an upright position when it has been moved to a position adjacent the die 7. This pivoted frame remover is provided with a pair of spring gripping fingers 29 on its opposite side edges which spring over and engage the edges of the sheet-carrying frame 3 and grip the frame so that when the frame remover is withdrawn from the die it will carry the frame and the formed sheet with it. The frame remover is provided with a transversely-extending shelf 30 at its lower edge on which the sheet-carrying frame may rest to hold it in position. The swingable frame-applying carriage 8 comprises a pair of angle irons 31 pivotally mounted to swing about an axis at 32.

The frame advancer 4 in its advancing movement moves the sheet-carrying frame 3 forwardly so that the side edges of the frame rest on the inwardly-extending flanges of the angle irons 31 of the swingable carriage 8. Thereafter, the frame advancer returns to its rearward position, leaving the way clear for the swingable carriage 8 to swing upwardly, carrying the sheet carrying frame 3 with it to bring the warm plastic sheet into sealing engagement with the edges of the forming die 7. When the sheet is brought to this position, rarified air is applied to the recess in the die to draw the warm plastic sheet into intimate engagement with the surface of the recess, thus holding the sheet in position on the die and enabling the frame-applying carriage 8 to return to its lowered position, leaving the frame and sheet carried thereby in position on the die. Thereafter, the frame advancer and frame remover slide 4 is moved forwardly, pushing another frame 3 carrying a sheet 2 into position over the frame-applying carriage 8 and picking off the frame 3 carrying the formed sheet from the die 7 and moving back to the position shown in Fig. 2.

Means are provided whereby the operation of the apparatus is largely automatic. The framing press 1 as shown is purely manually operated, but the frame advancer and frame remover slide 4, the swingable frame-applying carriage 8, and the control of the rarified air for sucking the sheet into the mold cavity, and the compressed air for removing the formed sheet and the sheet-carrying frame are largely automatic. The operation of a manually operated initiating lever 33 (Figs. 5 and 6) sets in motion the apparatus, causing a sequence of operations, the result of which will be that a frame carrying the cold plastic sheet, when fed to the machine, will be heated, brought up to the die, sucked into the die, blown out of the die, received by the frame remover, and returned to a position from which it may conveniently be removed from the apparatus.

The power means 13 for effecting the movement of the frame advancer and frame remover slide comprise a power cylinder 34 and piston rod 35 extending horizontally and longitudinally of the apparatus at one side thereof, the piston rod being connected at 36 to the side of the slide. In order to hold the follower 27 in engagement with the cam guide 28 to definitely position the frame remover 5 in its movement, a spring tensioned cable 38 is provided, secured to the frame remover at 39 and extending over suitable pulleys 39a or guides and secured at 39b to some reciprocating part controlled by the movement of the piston rod 35.

The pneumatic power means 14 for effecting movement of the frame-applying carriage comprise a power cylinder 40, piston rod 41 and transmission from the piston to the swingable carriage comprising a connecting link 42 pivotally connected to the piston rod at 43 and pivotally connected to the rock arm 44 at 45. This rock arm is pivotally mounted at 32 and is secured to the carriage 8 to rock it.

Means are provided for delivering cooling air to the formed sheet in position in the die through the air pipes 46 in communication with the vertical pipe sections 47 at the sides of the mold which are provided with jet apertures 48 for delivering jets of cooling air to the formed sheet.

In general the sequence of operations is as follows:

(1) The attendant presses on the lever 33 which, through the operation of the power control valve mechanism 50 causes compressed air to be admitted from the conduit 50a through the conduit 50b to the upper end of the cylinder 40. This moves the piston rod 41 downwardly and rocks the rockshaft 44 to move the frame applier 8 to the die 7 to cause the plastic sheet to be brought into sealing engagement with the die, as shown in Fig. 7.

(2) The swinging end of the rock lever 51 engages and depresses one end of the rock lever 52 which controls the valve mechanism 53 in such a way as to cause suction to be applied to the die 7 from the conduit 10 through the conduit 54 to suck the heated sheet of thermoplastic material against the surface of the recess 11 in the die.

(3) The swinging end of the rock lever 55 engages a valve 56 which admits air under pressure to the left-hand jet pipe 47 which directs the cooling air against the heated plastic sheet.

(4) The attendant lifts the control lever 33 to move it to "return" position, operating the valve 50 to admit compressed air to the lower end of the cylinder 40 from the line 50a through the line 56a and causing the piston to rise and return the applier from the die to receptive position and depress the rock levers 55 and 51 (Figs. 4 and 5). This lifting of the control lever 33 also opens the valve 56b admitting cooling air to the right-hand jet tube 47. When the lever 51 returns, the lever 52 returns to normal position, cutting off vacuum from the die 7.

(5) The return of one end of the lock lever 55, described in operation No. 4, controls the valve 57 in such a way as to admit air to the line 57a to initiate the operation of the delayed action valve mechanism 58 which, through the lines 57c and 57d, controls the movement of the advancer and remover slide 4 by means of the cylinder 34 and piston rod 35. This delayed action valve mechanism 58 is so designed that it will not start the movement of the frame advancer and remover slide 4 until the frame applier 8 has had time to get out of the way. The approaching movement of the frame remover feeds a new frame carrying the plastic sheet into position over the frame applier 8.

In the final movement of the slide 4 toward its extreme right-hand position, as viewed in Fig. 2, it engages a reciprocable block 63 which has a pin and slot connection 64 with a bell crank lever 65 which rocks the valve-controlling valve lever 52 to cause air under pressure to be supplied to the die from the compressed air supply 50 through the conduit 54. This frees the formed sheet from the die and assists the frame remover 26 in removing the formed sheet from the die 7. The valve 57 is controlled from the rock lever 52 to cause the return of the frame remover 5 by means of a link 58a pivotally connected at one end with the rock lever 52, a bell crank 59 pivotally mounted at 60 to which the other end of the link 58a is pivotally connected, and a link 61 pivotally connected to the bell crank lever 59 and slidably mounted in a suitable guide 62 which actuated a controller on the valve 57 (Fig. 4), thus shutting off the air to valve 58 and by such action returning slide 4 and frame remover 5 to their starting position.

The heating means 9 may comprise an oven or ovens of any suitable type which may be regulated to give the desired temperatures at the preheating station and at the final heating station. Any suitable heat source may be used such as an electric heater or a gas heater.

The type of materials which may thus be operated upon may be any suitable thermoplastic sheet stock, for example, cellulose compounds such as a cellulose acetate plastic, a cellulose aceto-butyrate pastic, a cellulose nitrate plastic, a plastic based upon a cellulose ether such as ethyl cellulose, or any of the large number of synthetic plastic materials such as the various forms of methyl methacrylate plastics and the various types of vinyl polymer and co-polymer plastics, etc., the only requisite being that the material be of such a nature that it may be economically heated to deforming temperatures within a reasonable range, say from 150° F. to 400° F.

The die may be made of any suitable material such as metal, wood, plaster, cement or any other substance which will not be adversely affected by the thermoplastic material.

Further modifications will be apparent to those skilled in the art and it is desired, therefore, that the invention be limited only by the scope of the appended claims.

Having thus described my invention, what I claim and desire to secure by Letters Patent is:

1. Apparatus for forming thermoplastic sheet material into a recessed formation comprising a die having a recess therein having a forming surface, a sheet-holding recess bounding frame for use with said forming surface, retaining means for holding on said frame a flat sheet of thermoplastic material heated to a plasticizing temperature against lateral slipping while the portion of said sheet to be formed in said die is otherwise contacted only by the atmosphere, means for effecting relative movement between said die and frame to bring a surface of the flat sheet into sealing engagement around and over the recess while said portion of said sheet to be formed is free of contact with said die and frame, means for effecting air pressure differential between the two faces of said portion of said sheet while its edges are held against slipping by said retaining means to force said portion of said sheet into the recess and against the forming surface, and means for moving said frame with the sheet material in recessed formation thereon away from said dye.

2. Apparatus for forming thermoplatic sheet material into recessed formation comprising a die having a recess therein having a forming surface, a sheet-holding recess bounding frame for use with said forming surface, retaining means for holding on said frame a flat sheet of thermoplastic material heated to a plasticizing temperature against lateral slipping while the portion of said sheet to be formed in said die is otherwise contacted only by the atmosphere, means for effecting relative movement between said die and frame to bring a surface of the flat sheet into sealing engagement around and over the recess while said portion of said sheet to be formed is free of contact with said die and frame, means for reducing the air pressure in the recess while the edges of said sheet are held against slipping by said retaining means to force said portion of said sheet into the recess and against the forming surface, and means for moving said frame with the sheet material in recessed formation thereon away from said die.

3. Apparatus for forming thermoplastic sheet material into a recessed formation comprising a die having a recess therein having a forming surface, a sheet-holding recess bounding frame for use with said forming surface, retaining means for holding on said frame a flat sheet of thermoplastic material heated to a plasticizing temperature against lateral slipping while the portion of said sheet to be formed in said die is otherwise contacted only by the atmosphere, means for effecting relative movement between said die and frame to bring a surface of the flat sheet into sealing engagement around and over the recess while said portion of said sheet to be formed is free of contact with said die and frame, means for effecting air pressure differential between the two faces of said portion of said sheet while its edges are held against slipping by said retaining means to force said portion of said sheet into the recess and against the forming surface, said die being stationary and said movement effecting means comprising a swingable applier on which said frame is mounted for movement toward the die, and means for moving said frame within the sheet material in recessed formation thereon away from said die.

4. Apparatus for forming into a recessed formation a flat plasticized sheet of thermoplastic material comprising a sheet-holding recess bounding frame, retaining means for holding said sheet on said frame against lateral slipping with the portion of said sheet to be formed contacted only by the atmosphere, a die having a recess therein having a forming surface, said die being adapted to telescope with said frame, means for effecting relative movement between said die and frame to telescope the same and bring a surface of the flat sheet into sealing engagement around and over the recess, means for effecting air pressure differential between the two faces of the sheet while its edges are held against slipping by said frame to force said portion of said sheet against the forming surface, and means for moving said frame with the sheet material in recessed formation thereon away from said die.

5. Apparatus for forming into a recessed formation a flat plasticized sheet of thermoplastic material comprising a sheet-holding recess bounding frame, retaining means for holding said sheet on said frame against lateral slipping with the portion of said sheet to be formed contacted only by the atmosphere, a die having a recess therein having a forming surface, said die being adapted to telescope with said frame, means for moving said frame into telescopic relation with said die to bring a surface of the flat sheet into sealing engagement around and over the recess, means for effecting air pressure differential between the two faces of the sheet while its edges are held against slipping by said frame to force said portion of said sheet against the forming surface, and means for moving said frame with the sheet material in recessed formation thereon away from said die.

6. Apparatus for forming into a recessed formation a flat plasticized sheet of thermoplastic material mounted and held against lateral slipping on a sheet-holding recess bounding frame comprising a die having a recess therein having a forming surface, means for moving said frame to bring a surface of the flat sheet into sealing engagement around and over the recess, means for effecting an air pressure differential between the two faces of the sheet while the edges of the sheet are held against slipping by said frame to force the sheet against the forming surface, and a frame remover separate and distinct from said frame moving means for removing said frame from said die.

7. Apparatus for forming into a recessed formation a flat plasticized sheet of thermoplastic material mounted and held against lateral slipping on a sheet-holding recess bounding frame comprising a die having a recess therein having a forming surface, means for moving said frame to bring a surface of the flat sheet into sealing engagement around and over the recess, means for effecting an air pressure differential between the two faces of the sheet while the edges of the sheet are held against slipping by said frame to force the sheet against the forming surface, and a swingable frame remover separate and distinct from said frame moving means for removing said frame from said die.

8. Apparatus for forming into a recessed formation a flat plasticized sheet of thermoplastic material mounted and held against lateral slipping on a sheet-holding recess bounding frame comprising a die having a recess therein having a forming surface, means for moving said frame to bring a surface of the flat sheet into sealing engagement around and over the recess, means for effecting an air pressure differential between the two faces of the sheet while the edges of the sheet are held against slipping by said frame to force the sheet against the forming surface, and a swingable frame remover for removing said frame from said die comprising a carriage reciprocable toward and from the die above the frame moving means.

9. Apparatus for forming into a recessed formation a flat plasticized sheet of thermoplastic material mounted and held against lateral slipping on a sheet-holding recess bounding frame comprising a die having a recess therein having a forming surface, means for moving said frame to bring a surface of the flat sheet into sealing engagement around and over the recess, means for effecting an air pressure differential between the two faces of the sheet while the edges of the sheet are held against slipping by said frame to force the sheet against the forming surface, and a swingable frame remover for removing said frame from said die comprising a carriage reciprocable toward and from the die above the frame moving means provided with a feeder for feeding a frame into position to be carried by said frame moving means.

10. Apparatus for forming into a recessed formation a flat plasticized sheet of thermoplastic material mounted and held against lateral slipping on a sheet-holding recess bounding frame comprising a die having a recess therein having a forming surface, means for moving said frame to bring a surface of the flat sheet into sealing engagement around and over the recess, means for effecting an air pressure differential between the two faces of the sheet while the edges of the sheet are held against slipping by said frame to force the sheet against the forming surface, and a swingable frame remover for removing said frame from said die comprising a carriage reciprocable toward and from the die above the frame moving means provided with a feeder for feeding a frame into position to be carried by said frame moving means, said frame moving means comprising an oscillatable carriage.

11. Apparatus for forming into a recessed formation a flat plasticized sheet of thermoplastic material mounted and held against lateral slipping on a sheet-holding recess bounding frame comprising a die having a recess therein having a forming surface, means for moving said frame to bring a surface of the flat sheet into sealing engagement around and over the recess, means for effecting an air pressure differential between the two faces of the sheet while the edges of the sheet are held against slipping by said frame to force the sheet against the forming surface, a swingable frame remover for removing said frame from said die comprising a carriage reciprocable toward and from the die above the frame moving means provided with a feeder for feeding a frame into position to be carried by said frame moving means, said frame moving means comprising an oscillatable carriage, and fluid-actuated cylinder and piston means for operating said carriages.

12. Apparatus for forming into a recessed formation a flat plasticized sheet of thermoplastic material mounted and held against lateral slipping on a sheet-holding recess bounding frame comprising a die having a recess therein having a forming surface, means for moving said frame to bring a surface of the flat sheet into sealing engagement around and over the recess, means for effecting an air pressure differential between the two faces of the sheet while the edges of the sheet are held against slipping by said frame to force the sheet against the forming surface, and a frame remover separate and distinct from said frame moving means mounted for movement toward and from said die.

13. Apparatus for forming thermoplastic sheet material into a recessed formation comprising a die having a recess therein having a forming surface for use with a sheet-holding recess bounding frame on which a flat sheet of thermoplastic material may be carried, means for heating the sheet carried by said frame to deforming temperature, means for effecting relative movement between said die and frame to bring a surface of the heated sheet into sealing engagement around and over the recess in said die, means for effecting an air pressure differential between the two faces of the heated sheet to force the same into the recess and against the forming surface, and means for moving said frame with the sheet material in recessed formation thereon away from said die.

14. Apparatus for forming thermoplastic sheet material into a recessed formation comprising a die having a recess therein having a forming surface for use with a sheet-holding recess bounding frame on which a flat sheet of thermoplastic material may be carried, means for heating the sheet carried by said frame to deforming temperature, a frame applying carriage for moving said frame to bring a surface of the heated sheet into sealing engagement around and over the recess in said die, means for effecting air pressure differential between the two faces of the heated sheet to force the same into the recess and against the forming surface and to hold said frame and sheet in forming position, and a frame remover for moving said frame with the 15. Apparatus for forming thermoplastic sheet material into a recessed formation comprising means providing an elongated heating area, a die at one end of said area having a recess therein having a forming surface for use with a sheet-holding recess bounding frame on which a flat sheet of thermoplastic material may be carried, means for receiving said frame with a sheet of said material thereon at the other end of said area, a frame applying carriage at said one end of said area for receiving said frame and moving the same to bring a surface of the heated sheet into sealing engagement around and over the recess in said die, means for effecting air pressure differential between the two faces of the heated sheet to force the same into the recess and against the forming surface and to hold said frame and sheet in forming position, and a frame remover reciprocable above said heated area for moving said frame with the sheet material in recessed formation thereon away from said die.

16. Apparatus for forming thermoplastic sheet material into a recessed formation comprising means providing an elongated heating area, a die at one end of said area having a recess therein having a forming surface for use with a sheet-holding recess bounding frame on which a flat sheet of thermoplastic material may be carried, means for receiving said frame with a sheet of said material thereon at the other end of said area, a frame applying carriage at said one end of said area for receiving said frame and moving the same to bring a surface of the heated sheet into sealing engagement around and over the recess in said die, means for effecting air pressure differential between the two faces of the heated sheet to force the same into the recess and against the forming surface and to hold said frame and sheet in forming position, a frame remover reciprocable above said heated area for moving said frame with the sheet material in recessed formation thereon away from said die, and means reciprocable with said frame remover for moving another frame with a sheet of said material thereon over said heated area and into operative position on said frame applying carriage while said frame remover is moving toward the frame on said die.

GUSTAVE W. BORKLAND.

REFERENCES CITED

The following references are of record in the file of this patent:

UNITED STATES PATENTS

| Number | Name | Date |
|---|---|---|
| 2,229,613 | Strauch | Jan. 21, 1941 |
| 2,295,066 | Weikert | Sept. 8, 1942 |
| 2,328,798 | Gardner | Sept. 7, 1943 |
| 2,367,642 | Helwig | Jan. 16, 1945 |
| 2,377,946 | Leary | June 12, 1945 |
| 2,383,810 | Masculine | Aug. 28, 1945 |